Jan. 12, 1954    D. E. MAXWELL    2,666,179
TRANSIENT ANALYZING SYSTEM
Filed Oct. 29, 1948    6 Sheets-Sheet 1

INVENTOR
DONALD E. MAXWELL
BY
Blair, Curtis & Hayward
ATTORNEYS

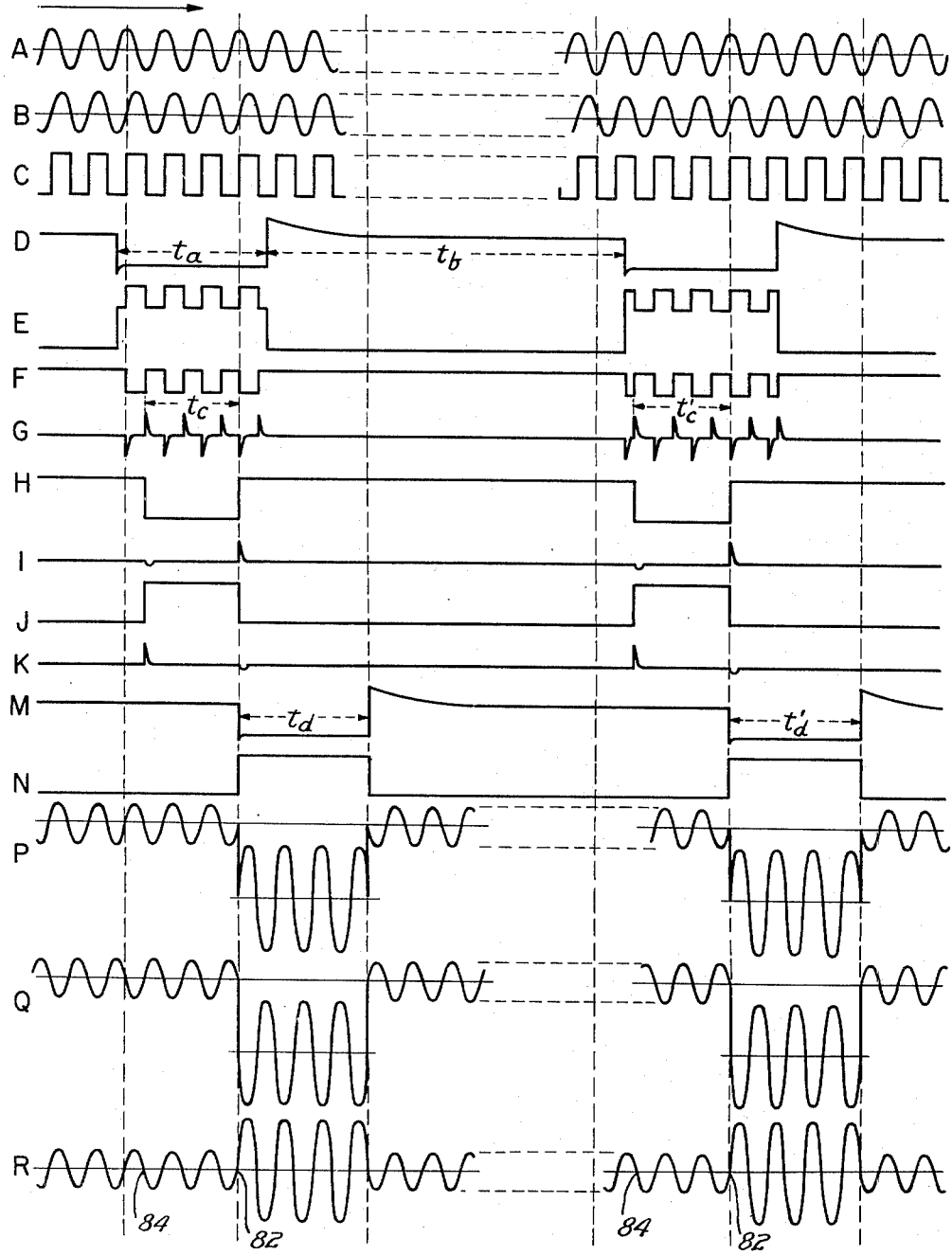

Jan. 12, 1954 D. E. MAXWELL 2,666,179
TRANSIENT ANALYZING SYSTEM
Filed Oct. 29, 1948 6 Sheets-Sheet 3

INVENTOR
DONALD E. MAXWELL
BY
Blair, Curtis & Hayward.
ATTORNEYS

INVENTOR
DONALD E. MAXWELL
BY
ATTORNEYS

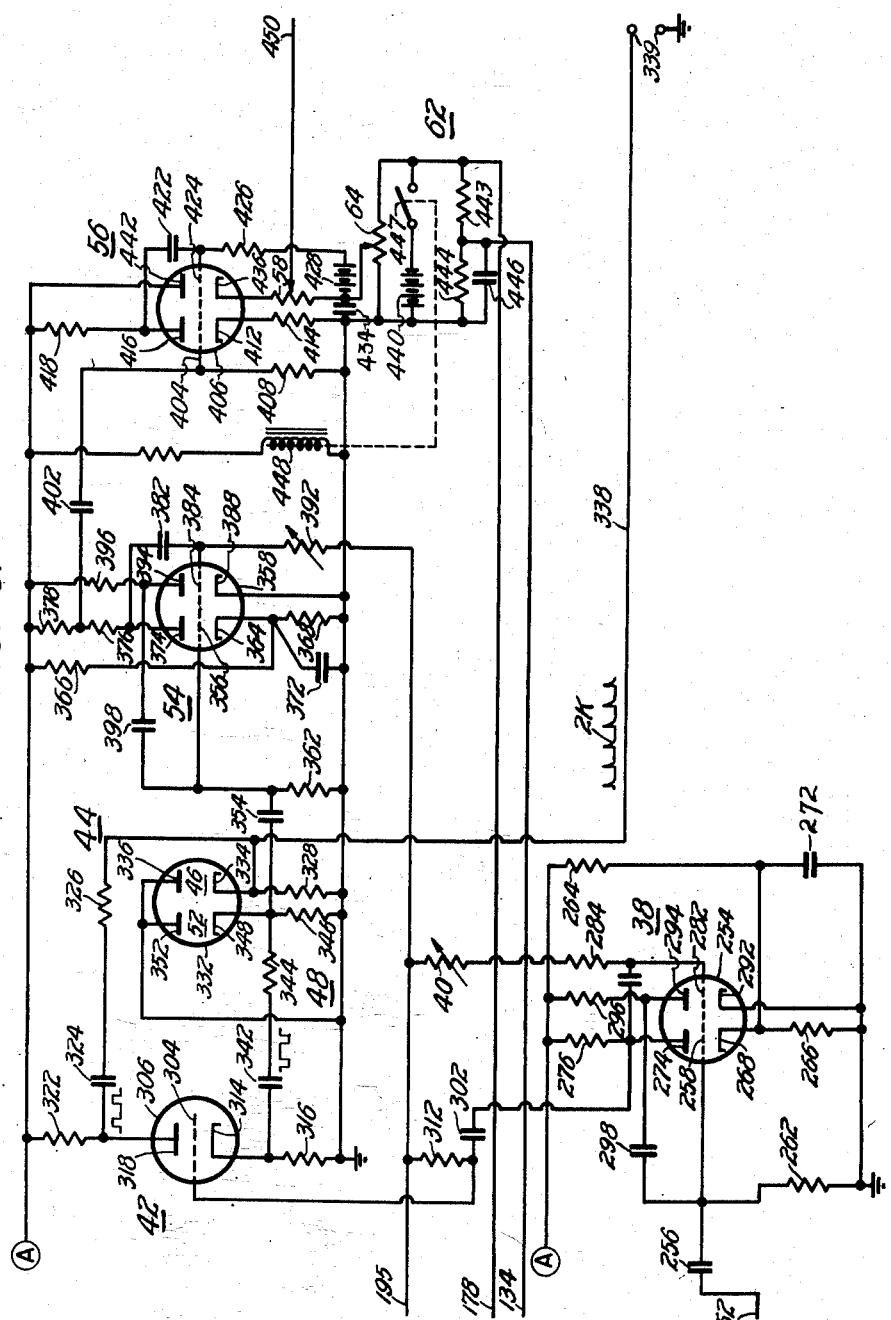

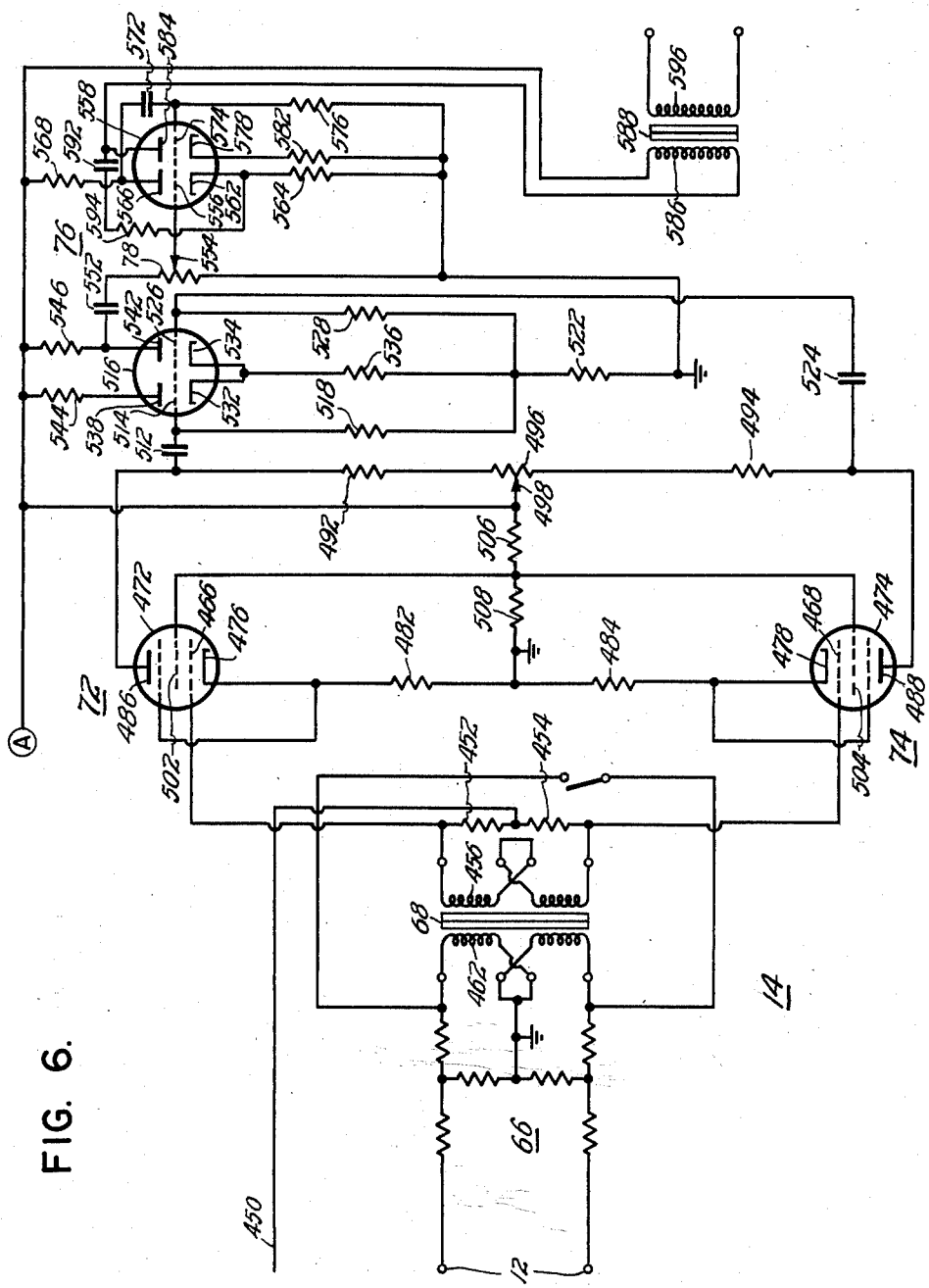

Patented Jan. 12, 1954

2,666,179

UNITED STATES PATENT OFFICE 2,666,179

TRANSIENT ANALYZING SYSTEM

Donald E. Maxwell, New Canaan, Conn., assignor to General Electric Company, a corporation of New York Application October 29, 1948, Serial No. 57,215

7 Claims. (Cl. 324—57)

This invention relates to the measurement of transient characteristics. More particularly, it relates to systems for the precise analysis of the transient characteristics of many types of audio frequency and acoustic devices.

In the design or study of apparatus for amplifying, recording, reproducing, or handling audio frequency signals, much can be learned of the characteristics of the equipment by testing the apparatus with sine waves, the frequency of which may be varied throughout the audio spectrum. However, apparatus that appears to be satisfactory from the results of such measurements may have other characteristics that are undesirable. For example, when the audio level, that is, the magnitude of the signals, suddenly changes from a low to a higher level there may be momentary reactions within the apparatus which prevent faithful reproduction of the sound. One method of measuring this effect is to apply square waves to the apparatus, but this procedure has the disadvantage that is difficult to analyze the results.

The present invention provides for a somewhat different measuring technique, utilizing the sine waves of changing amplitudes, and includes an electronic system for visually presenting the results of the test. This system is useful in the study of the transient responses of audio frequency amplifiers, microphones, loudspeakers, and other audio frequency and acoustical devices, and can be utilized also to investigate the acoustical buildup and decay characteristics of reverberent structures such as concert halls and broadcasting studios.

In accordance with one aspect of the present invention, a sine wave voltage is applied to the input circuit of the device or system to be measured, then at a subsequent time the amplitude of this signal is caused to increase rapidly to a larger value, maintained at this value for a certain time interval and then restored to its original magnitude. Provision is made for synchronization of a cathode ray oscilloscope so that the output signal of the apparatus under test can be observed visually or photographed. In a preferred embodiment, the visual display includes a few cycles of the sine wave of the output signal voltage before the increase in magnitude, the entire signal during the increased magnitude, and a few cycles after the return of the signal to its original level; the display being synchronized so as to maintain a steady pattern that may be studied or photographed as desired.

Accordingly, it is an object of this invention to provide an improved system for studying transient or dynamic characteristics of wave-handling apparatus.

Another object is to provide such a system having an improved arrangement for displaying such transient characteristics.

Still another object is to provide improved methods and apparatus for synchronizing the visual display of such phenomena.

Another object is to provide such a system having an improved synchronized system for obtaining the desired rapid amplitude change.

Another object is to provide an improved balancing circuit for eliminating "thump" or other undesired signal components.

A further object is to provide improved components, circuit arrangements, and methods which form only a part of the entire measuring system, but which in themselves are novel and useful in other applications.

Other objects will be in part pointed out in the following description, and in part apparent from consideration of that description in connection with the accompanying drawings in which:

Fig. 2 shows the instantaneous time relationships between the signals occurring at various points within the system;

Figs. 4, 5 and 6 are circuit diagrams of the electronic switch and synchronizer unit;

Figure 1:
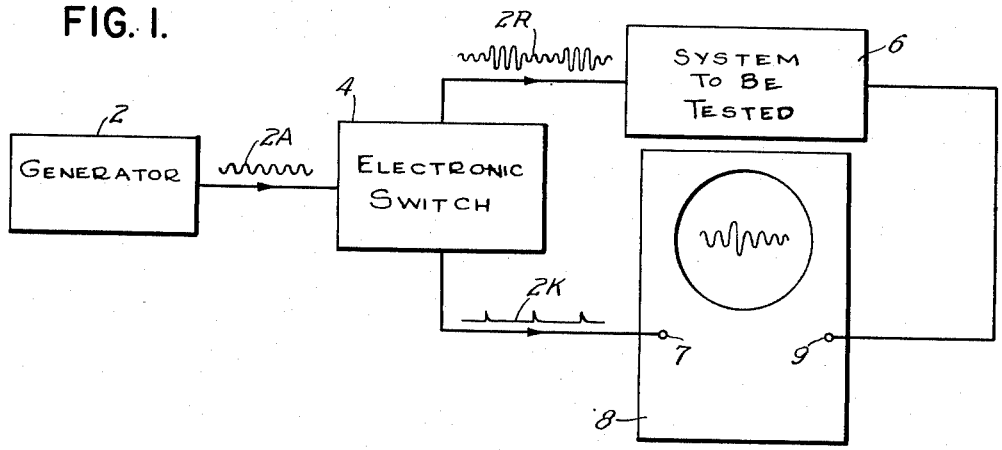
Fig. 1 is a block diagram of the apparatus for studying transient or dynamic characteristics of an audio frequency device or system.

The block diagram of Fig. 1 illustrates the operation of a preferred embodiment of the system. An audio frequency signal generator 2 provides an initial test signal 2A (corresponding to curve A in Fig. 2), and advantageously is variable over the audio frequency range, say, from 50 to 15,000 cycles. The signal 2A from the signal generator 2 is applied to an electronic switch and synchronizer unit 4, which performs two principal functions: (1) It recurrently increases the amplitude of the audio signal 2A from generator 2, causing this sudden increase in amplitude to take place at the exact time when the signal 2A is crossing the zero-axis. After a certain number of cycles, the signal is reduced to its lower value, thus forming a signal 2R (curve R in Fig. 2) that is applied to the input of an audio frequency system 6, the audio characteristics of which are being investigated. (2) The electronic switch and synchronizer unit 4 also provides a series of synchronizing pulses 2K, which may or may not be spaced exactly uniformly as a function of time, but which bear an exact predetermined time relationship to the high amplitude signals of signal 2R. These pulses advantageously are arranged to occur a few cycles before the increase in amplitude of signal 2R and are applied to the external synchronizing terminal 7 of an oscilloscope 8 in order to start the sweep of the oscilloscope so as to give the most desirable display of the transient or dynamic characteristics of the audio system 6. The output signal from the audio system 6 is applied to the vertical deflection terminal 9 of the cathode ray oscilloscope 8 in the usual manner.

It is apparent that for many applications the pulse-duration of the signal 2R, that is, the time during which the applied sine waves have increased amplitude, may be relatively short as compared with the intervals between the pulses; for example, in testing a loud speaker, it may be desirable to use a thousand cycle signal with a pulse-duration of 10 milliseconds (ten cycles of the sine wave voltage) and to provide an interval between successive pulses of approximately one second. The problem of synchronization is immediately apparent; that is, the increased amplitude advantageously occurs at the exact instant when the sine wave is crossing the zero-axis, thus necessitating an internal synchronization system within the electronic switch and synchronizing unit 4. The problem is further complicated by the fact that it is desirable in a practical unit that the audio frequency be continuously variable and that both the pulse length and the repetition rate of the signal 2R be independently adjustable. Moreover, suitable external synchronizing signals must be provided in order that a stationary pattern will be obtained upon the oscilloscope or other indicating or recording device.

Figure 3:
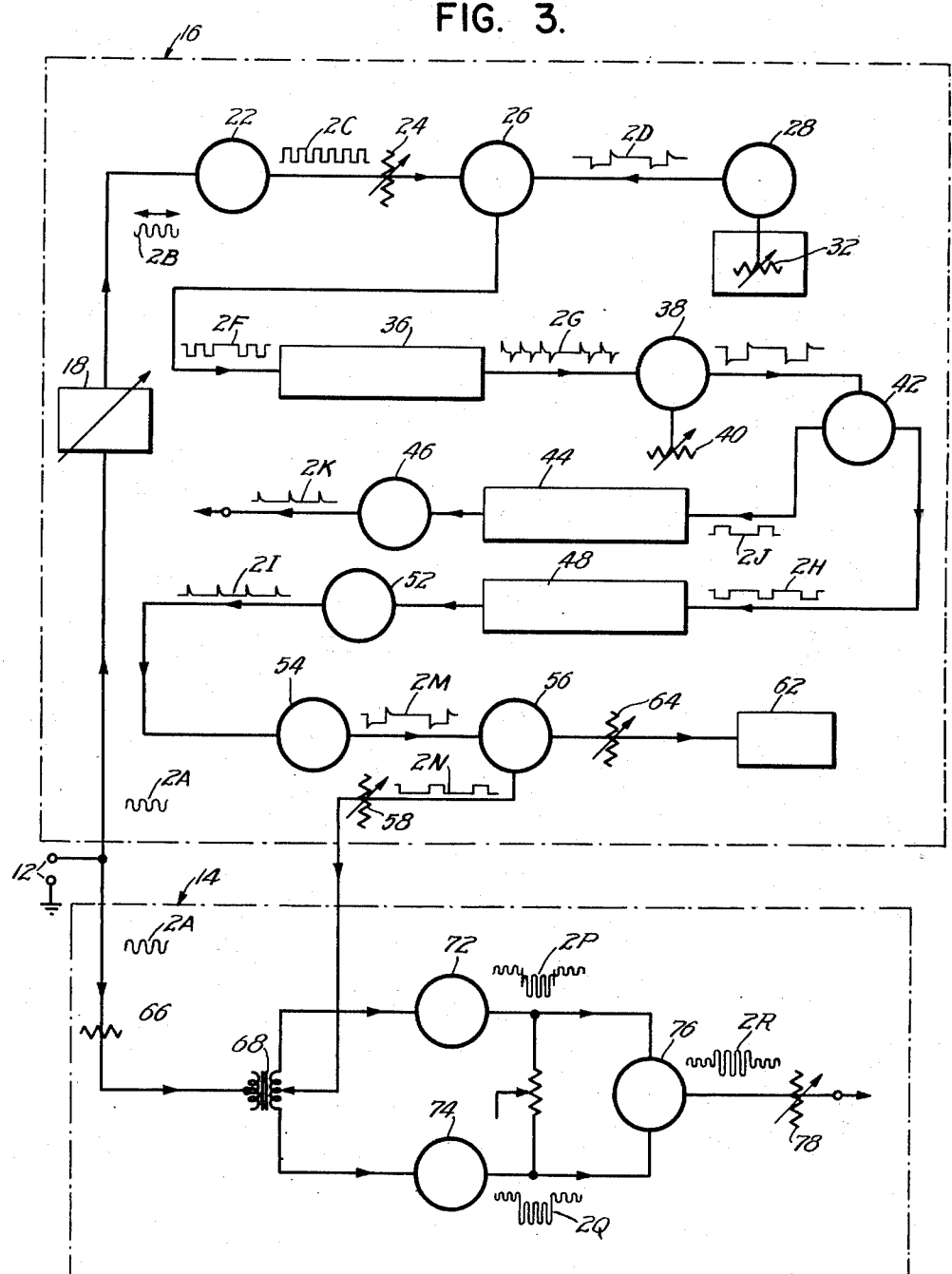
Fig. 3 is a block diagram of the electronic switch and synchronizer unit.

An understanding of the operation of the electronic switch and synchronizer unit 4 can be obtained by considering the curves shown in Fig. 2, together with the block diagram of Fig. 3. The signal generator 2 which may be a standard type audio oscillator delivers a sine wave voltage of the desired frequency to terminals 12 of the electronic switch and synchronizer unit 4 (Fig. 3). The wave forms appearing in the block diagram of Fig. 3 are appropriately lettered to correspond to the wave forms having similar alphabetical designations in Fig. 2, where they are presented on a common time axis. The signal from input terminals 12 is divided, and part of the signal is applied to an electronic switch, generally indicated at 14, and part applied to a synchronizer and switching-pulse generator, generally indicated at 16.

To control the action of the latter unit, the input signal is applied to a manually variable phase-shift network 18, by which the phase may be shifted as desired throughout 360 degrees. This phase shifting network is utilized in adjusting the equipment so that the amplitude change will occur exactly at the time when the input signal 2A is crossing the zero-axis.

The sine wave 2B from the phase-shift network 18 is identical with the input signal 2A, except that it is shifted in phase with respect to signal 2A. This signal is applied to an amplifier and squaring stage 22, which includes suitable means for clipping the positive and negative peaks to produce a square wave signal 2C, the magnitude of which is adjustable by means of a potentiometer 24. This square wave is in phase with the sine wave signal 2B from which it is derived. The square wave signal 2C is applied to a gating stage 26, which is controlled by the output of a free-running, dissymmetrical multivibrator 28 which delivers the wave form 2D, the dissymmetry of which is adjustable by means of a variable resistor 32 so that the time $T_b$ (see Fig. 2D) can be varied, for example, between the limits of approximately 0.3 second and 3 seconds. In this example, the time $T_a$ (also indicated in Fig. 2D) remains fixed at approximately .015 second for all values of $T_b$. A suitable switch is provided in connection with multivibrator 28 to convert it from a free-running type to a biased "one-shot" type so that the multivibrator will operate for only one cycle whenever suitable initiating voltage is applied. This is equivalent to increasing the time $T_b$ to infinity.

The signal from multivibrator 28 (Fig. 3) controls the operation of gating stage 26 and permits the passage only of negative portions of the square wave 2C, and permits these portions to pass only during the time $T_a$, to produce the wave form 2F.

For successful operation of the electronic switch and synchronizer unit, it is required that there be synchronism between the random pulsing of the multivibrator 28 and the applied sine wave voltage 2A from the external signal generator. Because the multivibrator in many applications will be recycling at a very slow rate, for example, once every three seconds, and because the applied sine wave frequency may be as high as 15,000 cycles per second, synchronization by any of the usual methods would be exceedingly complex and difficult of adjustment. The synchronizing system to be described is relatively simple and, once adjusted for a given sine wave frequency is independent of the recycling rate of multivibrator 28. Synchronization is assured by this system for even a single random cycle of the multivibrator, as would occur in "one-shot" operation. This synchronization is effected by the circuits now to be described.

The gating stage 26 is arranged to operate as a coincidence circuit, that is, the bias voltages in this stage are arranged so that the voltage pulses of wave form 2D in themselves produce no output from the gating stage 26, and the signal 2C applied to the input of gating stage 26 is also of insufficient amplitude to cause any signal output; thus, if either the signal 2C, from squaring stage 22, or the signal 2D, from the multivibrator 28, is applied alone to the gating stage 26, no output signal results. However, the periodic combination of the square wave voltage 2C and the multivibrator output voltage 2D at the input of gating stage 26 produces a net output voltage during those times when wave form 2D is negative, resulting in the wave form 2F. Note that the negative pulses from the multivibrator can be of an entirely random nature as regards either or both of the times $T_a$ and $T_b$, and that no synchronism is required between the multivibrator 28 and the square wave voltages 2C applied to the gating stage 26. Thus, the time relationship of the square wave pulses 2C with respect to the leading and trailing edges of the gating pulse from the multivibrator 28 is not fixed, and the gated wave form 2F may differ between two successive cycles of the multivibrator as shown by comparing the two pulse groups of Fig. 2F. Because of this lack of synchronism, the first negative pulse of each of these groups may occur at any time from zero to one-half the period of the audio wave 2B after the start of each negative pulse of signal 2D, and the same condition applies also to the last negative pulse of each group. However, a basis for synchronization is present in that the time measured from the trailing edge of the first negative pulse of each group in wave form 2F to either the leading or trailing edge of any subsequent negative pulse of the same group, is exactly the same in every group.

In order to establish multivibrator pulses having a precise synchronized relationship with the sine wave signals 2B, the signal 2F is passed through a differentiating network 36 (Fig. 3) which produces a sharp negative pulse each time the voltage of the square wave signal 2F changes value in a negative direction, and produces a similar, but positive pulse, each time the square wave voltages increases in a positive direction, thus, generating the signal 2G.

These differentiated pulses are utilized to control a multivibrator 38, the first positive-going pulse initiating the multivibrator pulse, with the subsequent positive pulses or pips having no appreciable effect on the circuit. However, by means of a suitable time constant circuit or pip-counting circuit, any desired negative pip (for example, up to approximately the tenth after the positive initiating pip) can be made to turn the multivibrator off, thus, ending the negative multivibrator pulse of voltage created at the output of the multivibrator 38. By this means, the multivibrator is prevented from further operation until the succession of pips forming one group of wave form 2G has ended, and the multivibrator will not recycle until the next group of pips arrives at a time $T_b$ later. In this example, the first positive pip of each group of the signal Fig. 2G initiates the multivibrator pulse, and the third negative pip measured from the positive initiating pip ends the negative pulse of the multivibrator, thus, providing a basis for synchronization. It is apparent that the length $T_c$ (Fig. 2) of the multivibrator pulse is exactly the same in each of the groups and, for example, with the condition of perfect symmetry of the square wave voltage of wave form 2C, the time $T_c$ may correspond to an odd number of half-cycles of the sine wave voltage of wave form 2B. In this particular example, $T_c$ corresponds to the period of 5 half-cycles of the sine wave 2B.

The output signal from multivibrator 38 (Fig. 3) is passed through a squaring and phase inverting stage 42, which delivers the output wave forms 2H and 2J, respectively.

The wave form 2J is passed through a differentiating network 44 and a negative pip-clipper 46 to produce the wave form 2K, which is applied to the synchronizing terminal 7 (see also Fig. 1) of the cathode ray oscilloscope 8. The sweep control circuit of the oscilloscope is adapted to provide a non-recurrent sweep of the cathode ray beam across the screen of the tube upon initiation by random pulses such as those of wave form 2K. One commercial type of oscilloscope that provides the required type of sweep control is the Dumont type 247. When wave form 2K is applied to the synchronizing circuit of such an oscilloscope, the cathode ray beam will sweep once across the screen of the tube, starting in synchronism with each positive pulse or pip. Because each pip bears a predetermined and synchronized phase relationship with the sine wave voltage of wave form 2A (as may be seen from Fig. 2), it is apparent that, if such a sine wave voltage is applied to the vertical deflection circuits of the oscilloscope, the cathode ray beam will always trace exactly the same pattern on the screen for each successive screen cycle, thus producing a stationary pattern on the screen even though the interval between successive sweeps may be of a random nature.

The wave form 2H from the squaring and phase inverting stage 42 is passed through a differentiating network 48 and a negative pip-clipper 52 to produce the wave form 2I which comprises a series of positive pips similar to the oscilloscope synchronizing pulses 2K, except that the pips of wave form 2I occur at a time $T_c$ later than those of wave form 2K.

The wave form 2I is utilized to control a one shot type multivibrator 54, each positive pulse of wave form 2I initiating a negative pulse by the multivibrator 54; the duration of this negative pulse being controlled by the time constants incorporated in the multivibrator 54, to produce the wave form 2M. For the purposes of visual analysis, as presented by the present system, the pulse time $T_d$ (see Fig. 2) of wave form 2M need not bear a precisely fixed time duration with respect of $T_d'$ of a successive cycle of the multivibrator 54, and, accordingly, no synchronism of the trailing edge of the negative pulses has been provided. During the time interval between successive pips of the wave form 2I, the switching pulse multivibrator 54 is arranged to become completely quiescent, and thus is prepared for the next cycle of its operation.

The wave form 2M is applied to a switching, pulse-shaping, and phase-inverting stage 56, which removes the characteristic negative spike on the leading edge of the wave form 2M and acts as a phase inverter to produce the wave form 2N, the magnitude of which is adjustable by means of a potentiometer 58. Suitable bias voltages are generated by a conventional power supply 62 and are applied through a potentiometer control 64 and stage 56 to regulate the operation of switching unit 14.

The signal 2N is utilized to control the switching action of the electronic switch 14. As mentioned above, the input signal from terminals 12 is applied to the electronic switch 14, the signal being applied through a balanced low-impedance attenuator 66 to the primary of an audio transformer 68, the secondary of which is connected to the control grids of push-pull switching stages 72 and 74. During the positive pulses of wave form 2N, the transconductance of the tubes in stages 72 and 74 is increased by an amount depending upon the adjustment of control 58. Thus, stage 72 produces the wave form 2P and stage 74 produces the wave form 2Q. These wave forms are combined in a balancing stage 76 to produce the final wave form 2R the magnitude of which may be controlled by a potentiometer 78. The signal 2R is applied to the input of the apparatus to be tested and utilized as described above.

The phase relationships of the various signals generated within the system are apparent from an examination of Fig. 2. Thus, for example, it will be seen that the increase in amplitude of the signal 2R, at points 82, always occurs at a time when the signal is crossing the zero axis. This is because the signal 2N, which controls the switching action, maintains a predetermined synchronized relationship with signal 2B. The signal 2B is adjustable in phase by means of the phase-adjuster 18 throughout 360 degrees so that it is apparent that adjustment of this control will produce the desired condition under all conditions of operation.

In this particular example, it is apparent also that the synchronizing pulses 2K initiate the oscilloscope sweep at points 84 thus providing presentation of a few cycles of wave form 2R preceding the increase in amplitude occurring at points 82.

It will be apparent that the individual circuits that may be utilized to perform the functions indicated by Figs. 2 and 3 may vary widely in nature, and the following description of detailed circuits for performing these functions is illustrative of a suitable arrangement and is given for the purpose of enabling those familiar with this art to devise and adapt suitable circuit arrangements each as may be best suited to a particular application.

*Synchronizer and switching pulse generator 16— phase shift network 18*

Figure 4:
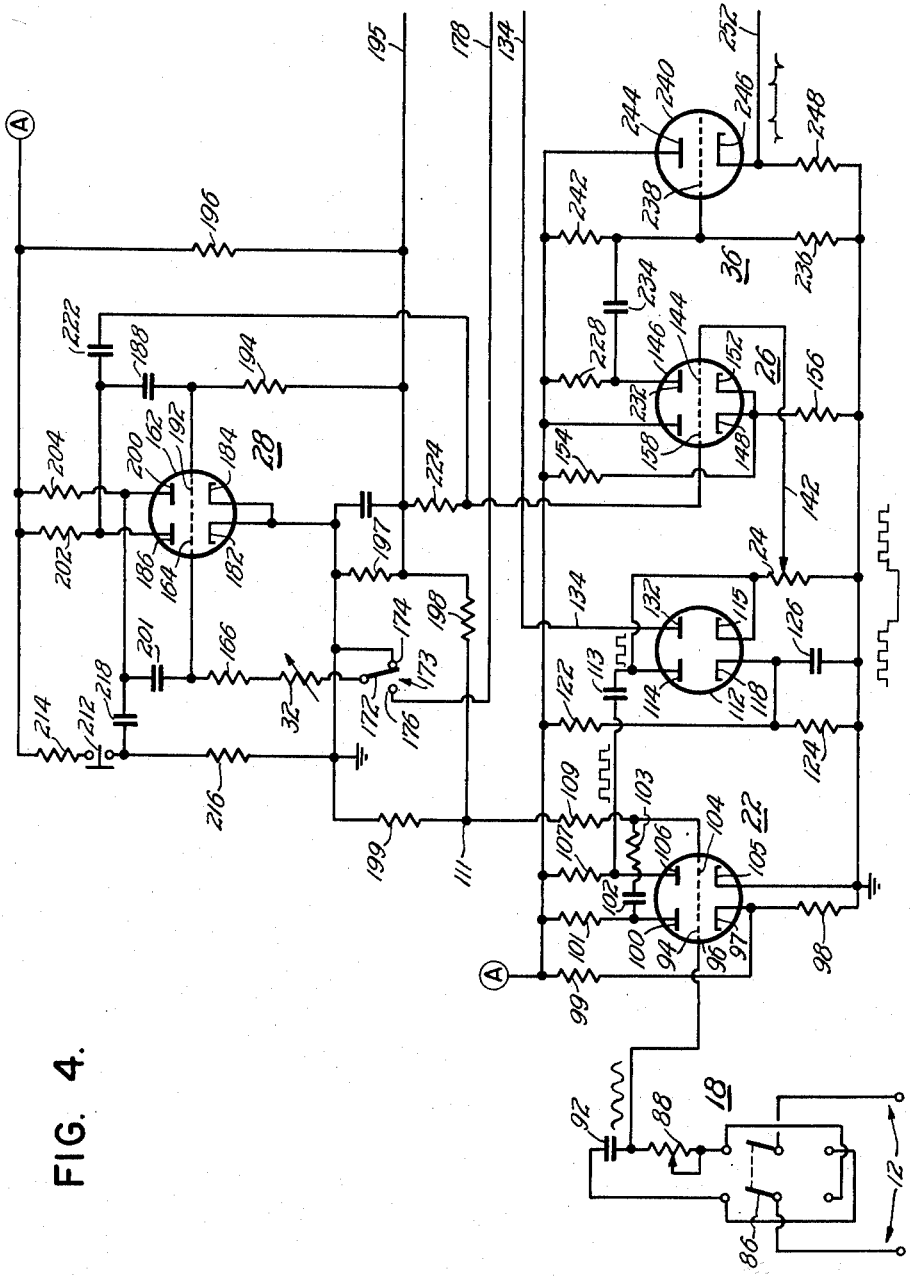

In Figures 4, 5, and 6, underlined numerals indicate generally the detail circuits for performing the functions of the correspondingly numbered blocks in Fig. 3.

The signal 2A from the signal generator 2 is applied to the terminals 12 (Fig. 4) which are connected to a reversing switch 86 so that the phase of the input signal may be shifted 180 degrees. The output of phase reversing switch 86 is applied through a network comprising a variable resistance element 88 and a capacitor 92. Adjustment of resistor 88 provides continuous adjustment of the phase of the test voltage over a range of approximately 180 degrees, so that, in combination with switch 86, continuous control of the phase shift throughout the 360 degree cycle is obtainable.

*Sine wave amplifier, squaring, and clipping stages 22*

The signal 2B from the phase shift network 18 is applied to a control grid 94 of a dual triode vacuum tube 96, the left-hand section of which (as seen in Fig. 4) acts as a class A amplifier stage.

The cathode 97 of this section of tube 96 is connected to ground through a bias resistor 98 and through a bleeder resistance 99 to a power supply, diagrammatically indicated at A, which, for example, delivers a regulated voltage of approximately 260 volts. The anode 100 of this section is connected through a plate load resistance 101 to the power supply A.

The output signal appearing at anode 100 of this stage is applied through a condenser 102 and a resistor 103 to a control grid 104 of the right-hand or second section of the same tube, this section providing further amplification and peak-clipping of the sine wave resulting in a partially squared output wave form. The cathode 105 of this section is connected directly to ground, and the anode 106 is connected through a plate load resistance 107 to the power source A. Control grid 104 of the second section of dual triode 96 is connected also through a resistance 109 to point 111, whereby a positive voltage will be applied to grid 104 from a source described below. The output section of tube 96 is shunted by a dual diode clipper tube 112 which symmetrically clips both the positive and negative peaks to produce a substantially square wave form 2C of the same frequency as the input wave 2B. Anode 106 is coupled through a condenser 113 to anode 114 and cathode 115 of dual diode tube 112. A positive voltage is applied to cathode 118 of this tube, which cooperates with anode 114, by means of a voltage divider comprising resistances 122 and 124 connected in series between power source A and ground; the cathode 118 being connected between resistors 122 and 124, so that a positive bias voltage, for example, of ten volts is impressed on cathode 118. The cathode 118 is connected also to ground through a condenser 126 in parallel with resistor 124.

A suitable negative bias voltage, for example, ten volts, is applied to anode 132 of tube 112 through a lead 134 which connects to the bias supply generally indicated at 62 in Fig. 5.

*Gating stage 26*

The amplitude of the square wave at the output of tube 112 is continuously variable by means of the potentiometer 24, and is coupled through a lead 142 to a control grid 144 in the second or right-hand section of a dual triode tube 146. Cathodes 148 and 152 are connected together and biased positively by means of a voltage divider circuit comprising series resistors 154 and 156 extending between the power source A and ground, the cathodes being connected to a point between these resistors. The resistor 156 is unbypassed so that the first and second sections of tube 146 are coupled together through the common cathode circuit. The control grid 158 of the first section is connected to the output of the free-running multivibrator, generally indicated at 28.

*Non-synchronous, variable repetition-rate multivibrator 28*

This multivibrator which is a dissymmetrical multivibrator producing the wave form 2D comprises a dual vacuum tube 162. Control grid 164 of the first or left-hand section is connected through a fixed resistance 166 in series with a variable resistance 32 (for adjusting the dissymmetry of the generated wave form) to arm 172 of a single pole, double throw switch, generally indicated at 173, arranged to alternatively connect resistor 32 to ground through switch contact 174 so that multivibrator 128 is free-running and self-sustaining, or through switch contact 176 and lead 178 to bias supply 62, whereby a negative voltage is placed on control grid 164 converting the multivibrator 28 into a "one-shot" type whereby the multivibrator operates only when it is externally initiated and then only for one cycle. Cathodes 182 and 184 of tube 162 are connected directly to ground. Anode 186 of the first section is coupled through a condenser 188 to control grid 192 of the second section which is provided with a D.-C. grid return through a resistance 194, which is connected to a source of positive bias applied to a lead 195 by means of a divider arrangement comprising resistors 196 and 197, connected in series between the power source A and ground. Series resistors 198 and 199 are in parallel with resistor 197 and provide the positive bias at point 111 for tube 96. Anode 200 of the second section of tube 162 is coupled through a capacitor 201 to control grid 164 of the first section. Anodes 186 and 200 are coupled, respectively, through load resistors 202 and 204 to power source A.

In order to initiate the single sweep when switch arm 172 is engaged with switch contact 176, a switch 212 is provided in series with a resistance 214 and a resistance 216 connected in series between power source A and ground, so that, when switch 212 is closed, a positive initiation pulse is applied through a condenser 218 and the condenser 201 to the control grid 164 of tube 162.

Gating stage 26—continued

The output signal is coupled from anode 186 through a condenser 222 to the control grid 158 of gating tube 146, this grid being biased positively with respect to ground through a resistance 223 connected between the grid 158 and the positive bias voltage lead 195.

With no signal applied to grid 158, the cathodes 148 and 152 are at a positive potential, for example, somewhat greater than 50 volts, because of the positive bias applied to grid 158 and the resulting current flow through the first section of the tube. Accordingly, the second section of tube 146, in which the grid is at D.-C. ground potential, is biased beyond plate current cut-off. Under this condition, the square wave voltage applied to grid 144 does not cause any plate current to flow in this section, and, thus, no voltage appears across plate load resistor 228, which is connected between anode 232 and power source A. However, when wave form 2D from multivibrator 28 is impressed on the grid 158 of the first section of tube 146, plate current through this section is cut off for the time $T_a$ (see Fig. 2). Accordingly, the cathodes 148 and 152 become less positive, but are prevented, by means of fixed bias, from dropping to a value which will permit any current to flow in the second section of tube 146. Thus, the voltage pulses of wave form 2D from the multivibrator 28 in themselves produce no output at the anode 232 of tube 146.

However, the periodic combination of the square wave voltage applied to grid 144 and the multivibrator output voltage applied to grid 158 produces a net grid-cathode voltage having the wave form 3E (Fig. 2) in the second section of tube 146. In other words, the multivibrator pulses of wave form 2D, which produce no plate current flow in the second section of tube 146, in effect, drive the voltage of the grid 144 of the second section sufficiently positive that the positive excursions of the square wave voltage impressed on this grid cause plate current to flow in the second section. Thus, there appears across the plate load resistor 228 the discontinuous and inverted square wave shown by wave form 2F (Fig. 2). Note, however, that the square wave output appears across this resistance 228 only for the duration of the time $T_a$ (Fig. 2). Thus, the action of tube 146 is of a gating or coincidence nature, allowing square waves to pass only during the negative or "gating" pulse from the multivibrator 28.

As noted above, the negative pulses from the multivibrator may be entirely of a random nature as regards either or both times, $T_a$ and $T_b$, and that there is no synchronism of any nature required between the multivibrator and the square wave voltage 2C applied to the gating tube 146. Thus, the time-relationship of the square wave pulses with respect to the leading and trailing edges of the gating pulse of the multivibrator is not fixed, and the gated wave form may differ between two successive groups, as pointed out above and shown in Fig. 2F. The gated groups of negative square wave pulses appearing at anode 232 are differentiated by means of a network 36 comprising a capacitor 234 and a resistance 236, connected in series between the anode 232 and ground. The output of this network consists of a group of negative and positive voltage "pips" corresponding to the leading and trailing edges, respectively, of the square wave pulses at the input to the network 36. These pips are shown as wave form 2G (Fig. 2). As discussed above, the time measured from the first negative pip to the first positive pip may vary from group to group, but the time measured from the first positive pip of any group to any subsequent negative or positive pip of the same group is always exactly the same in each group, and thus, provides a basis for synchronization. The output of the differentiating network 36 is applied to control grid 238 of a triode vacuum tube 240 which forms a cathode-follower isolation stage. Grid 238 is biased positively with respect to ground by means of a voltage divider arrangement comprising a resistor 242 connected in series with the resistor 236 between the power source A and ground. Anode 244 of tube 240 is connected directly to power source A, and cathode 246 of this tube is connected to ground through the cathode load resistance 248, the output signal being taken directly from the cathode by means of a lead 252.

Pre-switching multivibrator and phase inverter stage 38

The signal 2G, from tube 240, is applied to a dual triode multivibrator tube 254 (Fig. 5) which is of the "one-shot" type and is controlled in operation by the signal 2G. This signal is applied, through lead 252 and capacitor 256, to a control grid 258 of the first section of tube 254; a D.-C. ground return path is provided through a resistor 262. In order to bias the first section of the tube 254 to cut-off, a voltage divider circuit is provided comprising a resistance 264 and a resistance 266 connected in series between the power source A and ground, the cathode 268 being connected between the two resistances with a suitable bypass condenser 272 connected in parallel with cathode resistance 266. Anode 274 of the first section of tube 254 is connected to the power source A through a load resistance 276, and is coupled through a condenser 278 to a control grid 282 of the second section of tube 254. Control grid 282 is biased positively by means of a fixed resistance 284 in series with the variable resistance 406, which is connected to the positive bias supply lead 195. Cathode 292 of this section is connected directly to ground. Anode 294 of the second section, connected to power source A through a plate load resistance 296, is coupled through a capacitor 298 to control grid 258 of the first section.

Thus, in the quiescent state, the first section of tube 254 is non-conducting and the second section is conducting. When wave form 2G is applied to the first or off-section, the first pip of each group is always negative and drives the already negatively biased grid 258 still further negative, and no action occurs in the multivibrator. The first positive pip, however, renders the off-section conductive, producing a negative pulse of voltage at the output of the multivibrator 38, that is, at anode 274. Of the subsequent negative and positive pips which continue to be impressed on the grid 258, only the negative pips have any appreciable effect. These negative pips on the grid of the first section (which is now the on-section) are inverted in the plate circuit of this section and appear as positive pips on the grid 282 of the second of tube 254 (which is now the off-section). By suitable adjustment of the variable resistor 406, any desired negative pip (for example, up to the tenth after the positive initiating pip) appearing on the grid 258 of the first section of tube 254 can be made to turn the second section of the tube back on, thus concluding the negative pulse of voltage at the output of the multivibrator, and driving the grid of the first section highly negative. Before this negative charge can leak off to the point where a subsequent positive pip on the grid of the first section can turn this section on again, the succession of gated pips of the particular group will have ended. Therefore, the multivibrator tube 254 will not recycle until the next group of pips arrives at a time $T_b$ later.

*Squaring and phase inverting stage 42*

The output wave form from multivibrator tube 254 is coupled from anode 274 through a coupling condenser 302 to a control grid 304 of a triode tube 306, a D.-C. ground return path being provided through a resistance 312 which is connected to the positive bias supply lead 195.

The cathode 314 of tube 306 is connected to ground through an unbypassed cathode resistance 316, and the anode 318 is connected to power source A through a plate load resistor 322. The wave form 2H appears across the cathode resistance 316, while the inverted voltage, shown by wave form 2J, appears at the anode 318. This latter voltage is passed through the differentiating network 44 comprising a capacitor 324 and resistance elements 326 and 328 in series. These resistors 326 and 328 also perform the function of voltage division and resistance isolation. The fraction of the total differentiated voltage appearing across resistance 328 is shunted by the second section 46 of a dual diode vacuum tube 332, the cathode 334 of which is connected to one end of resistance 328, and the anode 336 of which is connected to the opposite end of resistance 328, that is, to ground. Thus, whenever cathode 334 becomes negative with respect to ground, current flows through the second section of diode 332, effectively eliminating the negative pips from lead 338, which is connected to the cathode 334, to provide the synchronizing voltage 2K which consists of a series of positive pips corresponding in time with the leading edges of the pulses of the wave form 2J. These synchronizing pulses or pips are conducted by the lead 338 to output terminals 339, so that it can be utilized as a positive triggering voltage for the sweep control circuit of the cathode ray oscilloscope 8.

The wave form 2H appears across cathode resistance 316 and is differentiated by means of a network 48 comprising capacitor 342 and resistors 344 and 346 in series, which resistors function also for the purposes of voltage division and isolation. The first section 52 of diode 332 is connected in parallel with resistance 346, cathode 348 being connected to one end of the resistor, and anode 352 to the other, or ground end, of the resistor 346. Thus, there is developed across the resistor 346 only the positive pips which result from differentiation of the wave form 2H, producing the wave form 2I which comprises a series of positive pips corresponding in time to the trailing edges of the pulses of wave form 2H, that is, the pulses of this wave form lag the pulses of wave form 2K by a time corresponding to $T_c$ (Fig. 2).

*Switching-pulse multivibrator 54*

The wave form 2I from cathode 348 of tube 332 is coupled through a condenser 354 to a control grid 356 of the first section of a "one-shot" multivibrator tube 358, a D.-C. ground return path being provided through a resistance 362. This first section of the dual triode tube 358 is the off-section of the multivibrator. Cathode 364 is biased positively with respect to ground by means of a voltage divider comprising resistances 366 and 368 in series between power source A and ground, resistance 368 being bypassed by a capacitor 372. Anode 374 of this section is connected through plate load resistances 376 and 378, in series, to the power source A, and is coupled also through a capacitor 382 to a control grid 384 of the second section of tube 358. The cathode 388 of this section is connected directly to ground. The grid 384 is biased positively through a variable resistance 392 connected to the positive bias supply lead 195 making this portion of the tube the on-section of the multivibrator. Anode 394 of this section is connected through a plate load resistance 396 to the power source A, and is coupled also through a condenser 398 back to the input grid 356 of the off-section of the tube 358. This tube thus comprises a "one-shot" multivibrator. When the voltage of wave form 2I is applied to the grid 356, each positive pip will initiate a pulse of negative voltage at the anode 374 as shown by curve 2M. The time duration $T_d$ of this negative pulse is established principally by the time constant of capacitor 382 and resistance 392. However, for the purposes of visual observation of the characteristics of peak limiting amplifiers, $T_d$ need not bear a precisely fixed time duration with respect to $T'_d$ as pointed out above, but for other applications, for example, in the analysis of acoustics phenomena, the resistance 392 can be adjusted advantageously so that the time $T_d$ corresponds to an integral multiple of the period of the sine wave 2A. During the time interval between the successive pips of wave form 2I the switching pulse multivibrator has time to become completely quiescent and, thus, is prepared for the next cycle of its operation.

*Phase-inverting and switching-pulse shaping stage 56*

The output voltage of the multivibrator tube 358 appearing at the junction of resistors 376 and 378, connected to the anode 374, is applied through a coupling condenser 402 to a control grid 404 of the first section of a dual triode tube 406, a D.-C. ground return path being provided through a resistance 408. The cathode 412 of this first section is returned to ground through a cathode resistance 414, and anode 416 is connected to power source A through a load resistance 418. The first section of tube 406 removes the characteristic spike on the leading edge of the wave form 2M and also acts as a phase inverter; the second section being connected as a cathode-follower which is normally biased for plate current cut-off.

Anode 416 of the first section of dual triode 406 is coupled through a capacitor 422 to a control grid 424 of the second section of the same tube, the grid 424 being returned to ground through a resistance 426, a bias battery 428, and a portion of the potentiometer 64. A suitable capacitor 434 is connected between the positive end of battery 428 and ground. Cathode 436 of this section is returned through the potentiometer 58 to the positive terminal of battery 428. Anode 442 of this section is connected directly to the power source A. Thus, the second section of tube 406 is connected as a cathode-follower with the control grid 424 normally biased beyond plate current cut-off by the battery 428. The voltage developed across the plate load resistor 418 is coupled to the control grid 424 of this section and, during the time $T_d$, the voltage at the grid 424 is sufficiently positive to produce plate current in the second section of tube 406. Thus, there is developed the voltage shown by wave form 2N across the cathode load potentiometer 58. A positive voltage from another battery 440 is applied also through potentiometer 64 to the cathode 436 and to the resistors 443 and 444 which are connected in parallel therewith; a suitable condenser 446 being placed in parallel with resistor 444. Lead 178 is connected to the positive end of resistor 443, and lead 134 is connected at the junction of resistors 443 and 444, to provide the two values of positive bias voltage for use in the circuits as described above. In order to prevent drain on the battery 440 when the equipment is not in use, this battery is connected in series with a normally open switch 447, controlled by a solenoid 448, which is arranged to close switch 447 only when power source A is energized. The potentiometer 64 regulates the D.-C. voltage applied to cathode 436 which voltage is used as a bias potential for the following stages, as will be described. Note, however, that because there is no plate current in the second section of tube 406, except during the time $T_d$, there is no steady D.-C. potential developed across the potentiometer 58.

*Electronic switching unit 14*

The positive pulses 2N of time duration $T_d$ appearing across potentiometer 58 serve as a keying voltage for the electronic switch 14 (Fig. 6). This signal is conducted by a lead 450 to the midpoint of two resistors 452 and 454 which are connected in series with each other and in parallel with the secondary winding 456 of transformer 68, the primary 462 of which is connected through an attenuating pad, generally indicated at 66, to the input terminals 12. The ends of secondary winding 456 are connected, respectively, to control grids 466 and 468 of super-control pentode tubes 472 and 474. A D.-C. bias voltage is applied to the grids 466 and 468 from the battery 440 (Fig. 5), the value of the bias being adjustable by means of the potentiometer 64, and in one typical application this bias value is adjusted to a value which reduces the plate transconductance of tubes 472 and 474 to a value about one-tenth of that for zero bias voltage on the grids. It is to be noticed that direct coupling has been provided between the potentiometer 58 and the grids of tubes 472 and 474, in order to preserve the wave shape of the switching pulse signal 2N. Note also that, because there is no D.-C. component of voltage across the potentiometer 58, the fixed bias on the grids 466 and 468 is independent of the setting of this potentiometer and dependent only on the setting of potentiometer 64.

Cathodes 476 and 478 of tubes 472 and 474 are returned to ground through cathode resistors 482 and 484, respectively. Anode voltage is applied to anodes 486 and 488 of these tubes through plate load resistors 492 and 494, respectively, which are connected to opposite ends of a potentiometer 496, the adjustable tap 498 of which is connected to the power source A. Screen grids 502 and 504 of tubes 472 and 474, respectively, are connected together and to a source of positive voltage derived by means of a voltage divider comprising resistances 506 and 508 connected between power source A and ground.

The positive switching pulses of wave form 2N are of such polarity as to increase the transconductance of the switching tubes 472 and 474 during each positive pulse. Depending upon the adjustment of potentiometer 58 (Fig. 5), the increase in transconductance during the switching pulses can be anything from zero to the order of ten times the quiescent value.

The sine wave signal voltage, from the external generator 2 that is connected to terminal 12, is applied to the tubes 472 and 474 in push-pull relationship, so that the grids 466 and 468 are 180 degrees out of phase. However, the switching pulse 2N is applied in phase to both tubes. Fig. 2P shows the resulting voltage across plate load resistance 492, and Fig. 2Q represents the voltage simultaneously appearing across the plate load resistance 494. Note that for the duration of the switching pulse (time $T_d$) the voltages across the plate load resistors consists of a D.-C. component plus a sine wave component. The amplitude of the sine wave voltage during this switching interval is shown to be larger than during the interval between switching pulses, because the increased transconductance of tubes 472 and 474 results in increasing amplification of the sine wave voltage.

*Switching-pulse balancing stage 76*

In order to remove the D.-C. component of the switching pulse from the wave forms 2P and 2Q, to produce the output wave form Fig. 2R, the signal from plate 486 is coupled through a condenser 512 to a control grid 514 of the first section of a dual triode vacuum tube 516, a D.-C.

ground return path being provided through a resistor 518, in series with a resistance 522. The signal from anode 488 is coupled through a condenser 524 to a control grid 526 of the second section of dual triode tube 516, a D.-C. return path being provided through a resistance 528 in series with the resistor 522. The cathodes 532 and 534 of this tube are connected together and to ground through a cathode resistance 536 in series with the resistor 522. This cathode resistance is unbypassed so that the first and second sections are coupled together through the common cathode resistance. The resistance 536 also provides self-biasing potential for the grids of the two sections which are returned to the junction of resistors 536 and 522 through their respective grid return resistors.

Anodes 538 and 542 of this tube are connected, respectively, through resistors 544 and 546 to power source A. The plate load resistors 544 and 546 are much lower in value than the common cathode resistance formed by resistors 536 and 522.

This amplifier stage has the characteristic that the signal voltage gain from the grids 514 and 526 to either plate load resistor is very much higher for 180 degree out-of-phase excitation of the grid than for the in-phase grid excitation. For out-of-phase (or push-pull) signal excitation, the voltage gain of tube 516 to either plate load resistor is given for practical purposes by the well known equation:

$$V.\ G. = \frac{uR_L}{r_p + R_L}$$

where $u$ and $r_p$ are identical in both sections of tube 516, and $R_L$ is represented by either resistor 544 or resistor 546 which, for purposes of illustration, are equal in value. However, when the grids of this tube are excited by in-phase signal voltage the voltage gain can be shown to be given by the expression:

$$V.\ G. = \frac{uR_L}{r_p + R_L + 2(u+1)R_c}$$

where $R_c$ refers to the total value of resistors 522 and 536 in series. Thus, the second equation has the additional term $2(u+1)R_c$ appearing in the denominator. This last term can be made very large in comparison with $r_p + R_L$ and, accordingly, the voltage gain for in-phase excitation of the grids may be very much less than for out-of-phase excitation. By way of illustration, for the values of resistors given in the subsequent table herein and assuming tube 516 to be a type 6SN7-GT tube, where $u$ is 20, and $r_p$ is 8000 ohms, the out-of-phase voltage gain to either of the plate load resistors is approximately 11, whereas the in-phase voltage gain as calculated by Equation 2 is approximately 0.1, a gain reduction to in-phase voltages of 110, or 41 db.

In operation, this stage serves to remove the D.-C. component of the switching pulse from the wave forms 2P and 2Q. The wave form 2P appearing across the plate load resistance of tube 472 is applied to the control grid 514 of one section of the tube 516, and the wave form 2Q appearing across the plate load resistance of tube 474 is applied to the control grid 526 of the other section of tube 516. The sine-wave components of these wave forms are applied to the respective grids of tube 516 in phase opposition, that is, in push-pull relationship, but the D.-C. components of the switching pulse are in-phase when applied to these grids. Accordingly, if the amplitudes of the D.-C. components applied to each grid are exactly equal, the relative amplitude of the switching transient appearing across the plate load resistor will be attenuated some 41 db in comparison with the sine-wave component.

However, this arrangement is not completely satisfactory, because, to some extent at least, the switching transient is still present. In order to further reduce or completely eliminate this switching transient the potentiometer 496 is provided as a balancing control. This potentiometer permits adjustment of the total plate load resistances of tubes 472 and 474 to any desired degree of inequality.

In order to understand more clearly how this balancing control 496 permits complete cancellation of the switching transient, consider this circumstance: the adjustable tap 498 is in its mid-position and the total plate load of tube 472 is equal to that of tube 474, and the D.-C. component of the switching pulse appearing across the plate load resistance of tube 472 is equal to that appearing across the plate load resistance of tube 474. Under these conditions, the D.-C. component will be greatly attenuated, but will still exist in some magnitude across load-resistor 546. However, assume potentiometer 496 is now adjusted so that the switching-transient voltage applied to the grid 514 of tube 516 is slightly greater than that applied to the grid 526. This, in effect, increases the switching transient voltage across the common cathode resistances 536 and 522, and is in the direction that tends to cancel any net transient voltage appearing between the grid 526 and cathode 534. Accordingly, the potentiometer 496 can be adjusted to a position such that no switching transient is developed across the output plate resistor 546 of tube 516. The sine-wave component, however, is altered very little by the balancing adjustment.

It can be seen that this arrangement will permit complete elimination of the switching transient even though the switching transient from tube 472 is not equal in magnitude to that from tube 474, for example, because of individual differences in the dynamic characteristics of tubes 472 and 474. It should be noted, moreover, that direct coupling is not required between the plate load resistances of tubes 472 and 474 and the repective grids of tube 516, because it is not necessary to preserve the original square shape of the D.-C. switching component as it appears on the grids of the tube 516, but only to retain symmetry between the two signals. Thus, capacitance-resistance coupling networks can be employed and the complications characteristic of direct coupling networks avoided.

The signal output voltage is coupled from anode 542 through a condenser 552 and variable tap 554 of the potentiometer 78 to a control grid 556 of a dual triode amplifier tube 558; the opposite end of the potentiometer 78 being connected to ground to provide a D.-C. return path. Cathode 562 of this section is connected to ground through a bias resistance 564, and anode 566 is connected to power source A through a plate load resistor 568. Anode 566 is coupled through a condenser 572 to control grid 574 of the second section of tube 558, a D.-C. return path being provided through a resistance 576. Cathode 578 of this section is connected to ground through a bias resistance 582, and anode 584 is connected to power source A through primary winding 586 of an output transformer 588. Negative feedback is provided from anode 584 through a condenser 592 and a resistor 594 to cathode 562. The amplifier or other apparatus to be tested is connected to secondary winding 596 of transformer 588.

The system described above is particularly applicable to the analysis of the performance of limiting amplifiers, and permits observation of the transient phenomena occurring at the output of the amplifier immediately after the application of a controlled-peak signal to the input. In such studies, it is usually desirable that the time between successive pulses be of the order of 1 to 3 seconds because the gain-recovery time of such amplifiers is ordinarily of this magnitude. In operation, the quiescent amplitude of the signal usually is adjusted to a value such that the peak-limiting amplifier is just below the point of gain-reducing action. When the amplitude is suddenly increased, a gain-reducing action occurs and the time for essentially completing this action is called the "attack time" of the amplifier. This gain-reducing action can be observed cycle by cycle of the applied sine wave, and the "attack time" can be measured by counting the number of cycles of a given frequency to the point where no further change of amplitude takes place. Accompanying affects, such as control-gain surges (thump) and wave form distortion are shown also with as much detail as is desired by proper adjustment of the oscilloscope sweep circuit.

It is to be noted that, with this method of transient analysis, it is important that the change in amplitude of the test signal from the lower to the higher value be made instantaneously at the time when the applied sine wave is crossing the zero axis. If the amplitude is changed during any other part of the cycle, an irregular wave front will be developed that will render the visually presented data less useful, and in many cases substantially meaningless.

In the above-described embodiment of the invention, no provision has been made for synchronizing the trailing edge of the wave form shown in Fig. 2M. However, in some applications, it may be desirable to do this, and for many applications it will be desirable to adjust the time constants of the multivibrator that produces this wave form so that precise control of the trailing edge is obtained, thus, permitting the time $T_d$ to be adjusted to correspond to an integral multiple of the period of sine wave 2A. For use in analysis of acoustical phenomena, it is desirable that the trailing edges of the keying pulses, shown in Fig. 2M, should be sharpened, and this can be accomplished readily by means well known in the art.

Also, in acoustical analysis, and in certain other applications, it is desirable that there be no signal occurring between the successive pulses of increased amplitude of the sine wave; that is, the plate currents of tubes 472 and 474 are completely cut-off between the successive pulses. In this case, it is desirable to utilize sharp-cut-off tubes instead of the super-control tubes 472 and 474. It is apparent that various other modifications may be made in the circuit details without exceeding the scope of the present invention. For example, in the above-illustrative embodiment, negative pips are used to turn off multivibrator 38, but it is apparent that the circuit could as well be arranged so that the positive pips serve as the timing control to turn off this multivibrator, the use of negative pipes probably having no other advantage than some simplification of the circuit arrangement. Such examples of equivalent arrangements could be cited at length, but it is to be understood that such substitutes are within the contemplated scope of the present invention as defined in the claims below.

The following table lists the values of the various components utilized in the above embodiment and are set forth here only for the purpose of assisting others to understand and utilize the invention and not for purposes of limitation.

*Resistance Elements*

| Number | Value in Thousands of Ohms |
|---|---|
| 24 | 200 |
| 32 | 2,000 |
| 40 | 2,000 |
| 58 | 10 |
| 64 | 10 |
| 78 | 1,000 |
| 88 | 1,000 |
| 98 | 0.39 |
| 99 | 82 |
| 101 | 100 |
| 103 | 270 |
| 107 | 100 |
| 109 | 270 |
| 122 | 82 |
| 124 | 1.5 |
| 154 | 56 |
| 156 | 4.7 |
| 166 | 270 |
| 194 | 3,000 |
| 196 | 39 |
| 197 | 10 |
| 198 | 47 |
| 199 | 6.8 |
| 202 | 33 |
| 204 | 15 |
| 214 | 47 |
| 216 | 2,000 |
| 224 | 1,000 |
| 228 | 33 |
| 236 | 470 |
| 242 | 1,000 |
| 248 | 10 |
| 262 | 390 |
| 264 | 47 |
| 266 | 4.7 |
| 276 | 33 |
| 284 | 100 |
| 296 | 33 |
| 312 | 1,000 |
| 316 | 4.7 |
| 322 | 4.7 |
| 326 | 47 |
| 328 | 10 |
| 344 | 10 |
| 346 | 47 |
| 362 | 100 |
| 366 | 47 |
| 368 | 3.9 |
| 376 | 20 |
| 378 | 10 |
| 392 | 1,000 |
| 396 | 33 |
| 408 | 1,000 |
| 414 | 1,000 |
| 418 | 7.5 |
| 426 | 1,000 |
| 443 | 6.2 |
| 444 | 4.7 |
| 452 | 0.3 |
| 454 | 0.3 |
| 482 | 0.5 |
| 484 | 0.5 |
| 492 | 3.9 |
| 494 | 3.9 |
| 496 | 0.5 |
| 506 | 68 |
| 508 | 27 |
| 518 | 1,000 |
| 522 | 47 |
| 528 | 1,000 |
| 536 | 0.91 |
| 544 | 10 |
| 546 | 10 |
| 564 | 3 |
| 568 | 100 |
| 576 | 1,000 |
| 582 | 1 |
| 594 | 100 |

Capacitance Elements

| Value | Value in Microfarads |
|---|---|
| 92 | 0.02 |
| 102 | 0.25 |
| 113 | 0.25 |
| 126 | 25 |
| 188 | 0.0047 |
| 201 | 0.5 |
| 218 | .001 |
| 222 | 0.1 |
| 234 | .0002 |
| 256 | .01 |
| 272 | 25 |
| 278 | .005 |
| 298 | 0.1 |
| 302 | 0.1 |
| 324 | .002 |
| 342 | .02 |
| 354 | .005 |
| 372 | 25 |
| 382 | .03 |
| 398 | .05 |
| 402 | .25 |
| 422 | 0.5 |
| 434 | 100 |
| 446 | 25 |
| 512 | 0.1 |
| 524 | 0.1 |
| 552 | .05 |
| 572 | .05 |
| 592 | 0.1 |

Tubes

| Number | Type |
|---|---|
| 96 | 6SL7-GT. |
| 112 | 6H6. |
| 146 | 6SN7-GT. |
| 162 | 6SN7-GT. |
| 240 | ½6SN7-GT. |
| 254 | 6SN7-GT. |
| 306 | ½6SN7-GT. |
| 332 | 6H6. |
| 358 | 6SN7-GT. |
| 406 | 6SN7-GT. |
| 472 | 6SK7. |
| 474 | 6SK7. |
| 516 | 6SN7-GT. |
| 553 | 6SN7-GT. |

Figure 7:
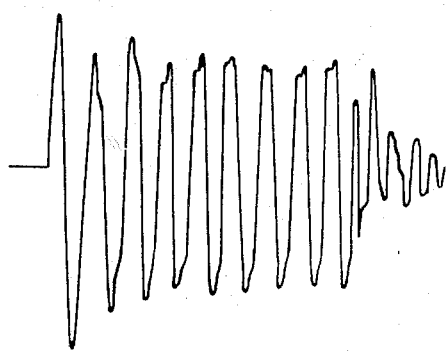
Fig. 7 illustrates the acoustic wave form resulting from the application of a test signal a typical two-unit loud speaker.
Figure 8:
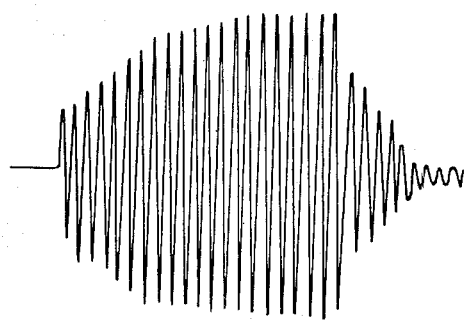
Fig. 8 shows the acoustic output of a typical single-unit type of loud speaker such as is found in home radio receivers.
Figure 9:
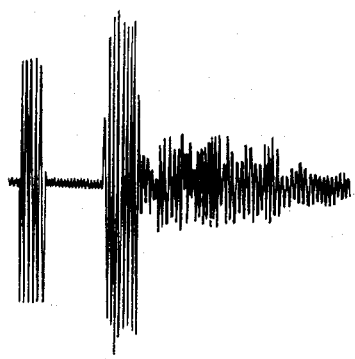
Fig. 9 illustrates the electrical voltage applied to a loud speaker in a typical large broadcast studio together with the wave form picked up by a microphone positioned at some distance from the loud speaker.

Figures 7, 8 and 9 show typical oscilloscope presentations occurring in the use of the present system. Figure 7 shows the acoustic wave form resulting from the application of a thousand cycle signal with a 10 millisecond pulse to a typical two-unit loud speaker, the pattern indicating considerable transient distortion. Part of the irregularity of the wave form is produced because of the two acoustic signal sources involved and the difference in acoustic path between the low frequency and high frequency radiating units.

Figure 8 represents the acoustic output of a typical single unit type of loud speaker such as is ordinarily found in home receivers. In this example, the sine wave frequency is 3 kilocycles and the pulse duration is 10 milliseconds. The gradual build-up of the acoustic amplitude to a value about 10 db greater than the initial cycle, and the strong hangover, or ringing, effect after the existing voltage is removed at the end of 10 millisecond-period are readily apparent.

Figure 9 is in reality a double exposure of two separate phenomena. The pulse at the left represents the electrical voltage applied to a loud speaker in a typical large broadcast studio. The speed of the sweep circuit for this application is relatively slow. For example, 200 milliseconds in total length, so that the resolution of the 1000-cycle per second signal, with a 10-millisecond sine wave pulse, is not shown in detail and an envelope patent results. The remainder of the oscilloscope represents the acoustic wave form picked up by a microphone positioned about 40 feet from the loud speaker, approximately 36 milliseconds elapses from the leading edge of the applied sine wave until the signal is received at the microphone. The relative intensities of the direct and reflected signals are shown clearly. Any outstanding echo effect would appear as a high amplitude pip, much as a radar echo.

From the foregoing, it will be observed that the electrical apparatus embodying my invention is well adapted to attain the ends and objects hereinbefore set forth, and to be economically manufactured, because the separate components are readily obtainable as standard items here and well suited to ordinary production methods. It is apparent that the particular circuit arrangements are subject to a wide variety of modifications in accordance with the state of the art and as may be desirable in adapting the invention to different uses. It is also apparent that novel circuit arrangements utilized to perform particular functions within the system, are in themselves useful in widely varied applications, and, accordingly, these features are not intended to be limited to use with any particular combination.

What I claim is:

1. In analyzing the characteristics of wave-handling apparatus, the method comprising the steps of generating a first sine wave signal, dividing said signal into second and a third signals, producing a substantially square wave form having a period integrally related to the period of said second signal, generating a first control pulse having a period longer than the period of said square wave form, gating said second signal in accordance with a predetermined polarity of said first control pulse so as to permit the passage of said square wave form only when said pulse assumes said polarity, differentiating said gated wave form to produce a series of groups of pips, generating a second control pulse synchronized with predetermined pips in each of said groups, differentiating said second control pulse to produce synchronizing signals of low recurrence rate having a predetermined synchronized relationship with said sine wave signal, generating a third control pulse in synchronized relationship with said synchronizing signals, amplifying said sine wave signal, controlling said amplification in accordance with the characteristics of said third control pulse, passing said amplified sine wave signal through said wave-handling apparatus and coupling the output signal from said wave-handling apparatus to a visual indicator.

2. The method of analyzing the characteristics of wave-handling apparatus comprising the steps of generating a first sine wave signal, dividing said signal into second and a third signals, producing a substantially square wave form having a period integrally related to the period of said second signal, generating a first control pulse having a period longer than the period of said square wave form, gating said second signal in accordance with a predetermined polarity of said first control pulse so as to permit the passage of said square wave form only when said pulse assumes said polarity, differentiating said gated wave form to produce a series of groups of pips, generating a second control pulse synchronized with predetermined pips in each of said groups, differentiating said second control pulse to produce first and second synchronizing signals of low recurrence rate having a predetermined synchronized relationship with said sine wave signal, generating a third control pulse in synchronized relationship with said first synchronizing signals, amplifying said sine wave signal, controlling said amplification in accordance with the characteristics of said third control pulse, passing said amplified sine wave through said wave-handling apparatus, coupling the output signal from said wave-handling apparatus to an oscilloscope, and synchronizing the sweep circuit of said oscilloscope with said second synchronizing signal.

3. Apparatus for use in measuring the characteristics of wave-handling apparatus comprising a signal generator, an electronic switch coupled to said signal generator, a synchronizing and switching pulse generator coupled to said signal generator for controlling the action of said electronic switch, said synchronizing and switching pulse generator comprising a square wave generator actuated by the signal from said signal generator and producing a square wave bearing a predetermined synchronized relationship thereto, a gating circuit including a first pulse generator and coupled to the output of said square wave generator and selectively passing spaced groups of said square waves in accordance with the signals from said first pulse generator, a first differentiator circuit for differentiating said groups of square waves and producing spaced groups of control pips, a second pulse generator controlled by predetermined pips in each of said groups, a second differentiator circuit coupled to said second pulse generator and producing a first and second series of spaced synchronizing pips, and a third pulse generator controlled by said first series of synchronizing pips and having an output circuit coupled to said electronic switch whereby the magnitude of the signal from said signal generator is controlled by the output of said third pulse generator, the output of said electronic switch being coupled to said wave-handling apparatus the characteristics of which are to be measured, an indicator coupled to the output of said wave-handling apparatus, and a circuit coupling said second series of synchronizing pips to said indicator.

4. Apparatus for use in measuring the characteristics of wave-handling apparatus comprising a signal generator, a dividing circuit for dividing the signal from said signal generator into first and second parts, an adjustable phase shifter for shifting the phase of one of said parts relatively to the other, an electronic switch coupled to said second part of said signal, a synchronizing and switching pulse generator coupled to said first part of said signal for controlling the action of said electronic switch, said synchronizing and switching pulse generator comprising a square wave generator actuated by said second part of said signal from said signal generator and producing a square wave bearing a predetermined synchronized relationship thereto, a gating circuit including a first pulse generator and coupled to the output of said square wave generator and selectively passing spaced groups of said square waves in accordance with the signals from said first pulse generator, a first differentiator circuit for differentiating said groups of square waves and producing spaced groups of control pips, a second pulse generator controlled by predetermined pips in each of said groups, a second differentiator circuit coupled to said second pulse generator and producing a first and second series of spaced synchronizing pips, and a third pulse generator controlled by said first series of synchronizing pips, and having an output circuit coupled to said electronic switch whereby the magnitude of the signal from said signal generator is controlled by the output of said third pulse generator, the output of said electronic switch being coupled to said wave-handling apparatus the characteristics of which are to be measured, a cathode ray oscilloscope having a sweep circuit and coupled to the output of said wave-handling apparatus, and a circuit coupling said second series of synchronizing pips to said sweep circuit.

5. Apparatus for use in measuring the characteristics of wave-handling apparatus comprising a signal generator, a dividing circuit for dividing the signal from said signal generator into first and second parts, an adjustable phase shifter for shifting the phase of one of said parts relatively to the other, an electronic switch coupled to said second part of said signal, a synchronizing and switching pulse generator coupled to said first part of said signal for controlling the action of said electronic switch, said synchronizing and switching pulse generator comprising a square wave generator actuated by said second part of said signal from said signal generator and producing a square wave bearing a predetermined synchronized relationship thereto, a gating circuit including a first pulse generator and coupled to the output of said square wave generator and selectively passing spaced groups of said square waves in accordance with the signals from said first pulse generator, a first differentiator circuit for differentiating said groups of square waves and producing spaced pips, a second pulse generator controlled by predetermined pips in each of said groups, a second differentiator circuit coupled to said second pulse generator and producing a first and second series of spaced synchronizing pips, and a third pulse generator controlled by said first series of synchronizing pips, said electronic switch comprising an amplifier for amplifying said second part of said signal from said signal generator, a circuit coupling said third pulse generator to said amplifier whereby the gain of said amplifier is caused to increase rapidly upon receipt of a pulse from said third pulse generator, said phase shifter being adjusted so that the increase in gain occurs when said second part of said signal is at substantially zero amplitude, and a balancing circuit for removing the D.-C. switching component from said amplified signal, the output of said electronic switch being coupled to said wave-handling apparatus the characteristics of which are to be measured, an indicator coupled to the output of said wave-handling apparatus, and a circuit coupling said second series of synchronizing pips to said indicator.

6. Apparatus for use in measuring the characteristics of wave-handling apparatus comprising a signal generator, an electronic switch coupled to said signal generator, a synchronizing and switching pulse generator coupled to said signal generator for controlling the action of said electronic switch, said synchronizing and switching pulse generator comprising a square wave generator actuated by the signal from said signal generator and producing a square wave bearing a predetermined synchronized relationship thereto, a gating circuit including a first multivibrator and coupled to the output of said square wave generator and passing spaced groups of said square waves in accordance with the signals produced by said multivibrator, a first differentiator for differentiating said groups of square waves and producing spaced groups of control pips, a second multivibrator controlled by predetermined pips in each of said groups, a second differentiator circuit coupled to said second multivibrator and producing a first and second series of spaced synchronizing pips, and a third multivibrator controlled by said first series of synchronizing pips, said electronic switch including two vacuum tubes arranged to handle the signal from said signal generator in push-pull manner, a circuit coupling the output of said third multivibrator to said tubes in in-phase relationship, and a balancing circuit coupled to the output of said tubes for removing the switching component from said signals, the output of said balancing circuit being coupled to said wave-handling apparatus the characteristics of which are to be measured, an indicator coupled to the output of said wave-handling apparatus, and a circuit coupling said second series of synchronizing pips to said indicator.

7. Apparatus for use in measuring the characteristics of wave-handling apparatus comprising a signal generator, delivering a sine wave signal, an electronic switch coupled to said signal generator, a synchronizing and switching pulse generator coupled to said signal generator for controlling the action of said electronic switch, an adjustable phase shifted for varying the relative phase of the signals coupled from said signal generator to said electronic switch and said synchronizing and switching pulse generator, said synchronizing and switching pulse generator comprising a square wave generator actuated by the signal from said signal generator and producing a square wave bearing a predetermined synchronized relationship thereto, a gating circuit including a first multivibrator and coupled to the output of said square wave generator and passing spaced groups of said square waves in accordance with the signals produced by said multivibrator, a first differentiator for differentiating said groups of square waves and producing spaced groups of control pips, a second multivibrator controlled by predetermined pips in each of said groups and generating a series of pulses in fixed phase relationship to said sine wave signal, a second differentiator circuit coupled to said second multivibrator and producing a first and second series of spaced synchronizing pips, and a third multivibrator controlled by said first series of synchronizing pips, said electronic switch including two amplifier tubes arranged to handle the signal from said signal generator in push-pull manner, a circuit coupling the output of said third multivibrator to said tubes in in-phase relationship and controlling the amplification thereof, and a balancing circuit coupled to the output of said tubes for combining the signals therefrom and removing the switching component from the combined signals, the output of said balancing circuit being coupled to said wave-handling apparatus the characteristics of which are to be measured, and a cathode-ray oscilloscope having a recurrent sweep circuit and coupled to the output of said wave-handling apparatus, and a circuit coupling said second series of synchronizing pips to said sweep circuit for maintaining a stabilized visual presentation on said oscilloscope.

DONALD E. MAXWELL.

References Cited in the file of this patent

UNITED STATES PATENTS

| Number | Name | Date |
|---|---|---|
| 2,094,472 | Rohats | Sept. 28, 1937 |
| 2,189,457 | Archer | Feb. 6, 1940 |
| 2,280,226 | Firestone | Apr. 21, 1942 |
| 2,292,136 | Lindsay et al. | Aug. 4, 1942 |
| 2,297,393 | Deserno | Sept. 29, 1942 |
| 2,310,342 | Artzt | Feb. 9, 1943 |
| 2,394,933 | Mueller et al. | Feb. 12, 1946 |
| 2,443,603 | Crost | June 22, 1948 |
| 2,462,897 | Rector | Mar. 1, 1949 |
| 2,471,268 | Gaines | May 24, 1949 |

OTHER REFERENCES

Williams: Radio News, January 1944, pages 24, 25, 78, 80, 82.

Moritz: Electronics, June 1946, pages 130–135.